(12) United States Patent
Ahmed et al.

(10) Patent No.: US 6,232,414 B1
(45) Date of Patent: May 15, 2001

(54) PROCESS TO MAKE A MONOVINYLAROMATIC POLYMER AND SAID MONOVINYLAROMATIC POLYMER

(75) Inventors: Iqbal Ahmed; Syriac J. Palackal; M. Bruce Welch; Jianxin Kuang; George A. Moczygemba, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/281,880

(22) Filed: Mar. 31, 1999

(51) Int. Cl.$^7$ .............................. C08F 4/16; C08F 112/08
(52) U.S. Cl. .................. 526/160; 526/347.1; 526/347.2; 526/943; 502/152
(58) Field of Search ..................... 526/160, 161, 526/943, 346, 347, 347.2, 348.6, 64

(56) References Cited

U.S. PATENT DOCUMENTS

| | | | | |
|---|---|---|---|---|
| 5,403,908 | * | 4/1995 | Watanbe et al. | 526/284 |
| 5,536,797 | * | 7/1996 | Nickias et al. | 526/170 |
| 5,543,481 | | 8/1996 | Takeuchi et al. | 526/126 |
| 5,571,880 | | 11/1996 | Alt et al. | 526/160 |
| 5,596,055 | | 1/1997 | Aoyama et al. | 526/153 |
| 5,623,034 | | 4/1997 | Aoyama et al. | 526/160 |
| 5,869,591 | * | 2/1999 | McKay et al. | 526/347 |
| 6,057,410 | * | 5/2000 | Alt et al. | 526/308 |

\* cited by examiner

Primary Examiner—David W. Wu
Assistant Examiner—R. Harlan
(74) Attorney, Agent, or Firm—Edward L. Bowman

(57) ABSTRACT

A process to produce a monovinylaromatic polymer is provided. Said monovinylaromatic polymer is provided.

10 Claims, No Drawings

US 6,232,414 B1

PROCESS TO MAKE A MONOVINYLAROMATIC POLYMER AND SAID MONOVINYLAROMATIC POLYMER

FIELD OF THE INVENTION

This invention is related to the field of polymers.

BACKGROUND OF THE INVENTION

One of the most important processes for the production of homopolymers of ethylene or copolymers of ethylene/monoolefin is called the slurry polymerization process. Usually, this process employs a diluent, such as, for example, isobutane. However, while this process is very versatile in producing these polymers, it has long been desirable to produce other polymers using this process. This is because of the cost saving that can be realized by utilizing the same commercial operating equipment to produce different polymers.

The invention herein is a step towards this direction.

SUMMARY OF THE INVENTION

It is an object of this invention to provide a process to produce a monovinylaromatic polymer.

It is another object of this invention to provide a monovinylaromatic polymer.

In accordance with this invention a process to produce a monovinylaromatic polymer is provided. Said process comprises polymerizing at least one monovinylaromatic to form a monovinylaromatic polymer, wherein said polymerizing:

(1) is conducted using at least one M-catalyst;
(2) is conducted under polymerization conditions, where said polymerization conditions comprise a temperature from about 0° C. to about 300° C. and a pressure from about 100 kPa to about 1000 kPa;
(3) is conducted in a polymerization zone; and
(4) is conducted in the presence of isobutane.

In accordance with this invention a monovinylaromatic polymer is provided. Said monovinylaromatic polymer is produced by said process.

These objects and other objects of this invention are further disclosed in the following.

DETAILED DESCRIPTION OF THE INVENTION

The monovinylaromatic monomers that can be used in this invention contain from about 8 to about 20 carbon atoms. However, it is more preferred when these monomers contain about 8 to about 12 carbon atoms. Suitable examples of such monomers are styrene, alpha-methyl styrene, 2-methylstyrene, 3-methylstyrene, 4-methylstyrene, 2-ethylstyrene, 3-ethylstyrene, 4-ethylstyrene, 4-n-propylstyrene, 2-t-butylstyrene, 2,4-dimethylstyrene, and 4-cyclohexylstyrene. Styrene is currently most preferred.

These monomers are polymerized using at least one M-catalyst. For the purposes of this invention M-catalyst is defined as those catalysts that have the following general formula.

FORMULA ONE: $(X^1)(X^2)(X^3)(X^4)M^1$

In this formula, $M^1$ is selected from the group consisting of titanium, zirconium, and hafnium. Currently, it is most preferred when $M^1$ is titanium.

In this formula $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

The substituents on the substituted cyclopentadienyls, substituted indenyls, and substituted fluorenyls, can be aliphatic groups, cyclic groups, combinations of aliphatic and cyclic groups, and organometallic groups, as long as these groups do not substantially, and adversely, affect the polymerization activity of the catalyst. Additionally, hydrogen can be a substituent.

Suitable examples of aliphatic groups are hydrocarbyls, such as, for example, paraffins and olefins. Suitable examples of cyclic groups are cycloparaffins, cycloolefins, cycloacetylenes, and arenes. Additionally, alkylsilyl groups where each alkyl contains 1–12 carbon atoms, alkyl halide groups where each alkyl contains 1–12 carbon atoms, or halides, can also be used.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, and iodo.

In this formula $(X^3)$ and $(X^4)$ are independently selected from the group consisting of (hereafter "Group OMC-II") halides, aliphatic groups, cyclic groups, combinations of aliphatic and cyclic groups, and organometallic groups, and oxyaliphatic groups, as long as these groups do not substantially, and adversely, affect the polymerization activity of the catalyst.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to 10 carbon atoms. However, it is most preferred when $(X^3)$ and $(X^4)$ are selected from the group consisting of fluoro, chloro, methoxy, and methyl.

In this formula, $(X^2)$ can be selected from either Group OMC-I or Group OMC-II. However, it is most preferred when $(X^2)$ is selected from Group OMC-II. This is because "half-sandwich" metallocenes are most preferred.

When $(X^2)$ is selected from Group OMC-I, it should be noted that $(X^1)$ and $(X^2)$ can be joined with a bridging group, such as, for example, aliphatic bridging groups, cyclic bridging groups, combinations of aliphatic and cyclic bridging groups, and organometallic bridging groups, as long as the bridging group does not substantially, and adversely, affect the polymerization activity of the catalyst. However, currently bridging groups are not preferred.

Suitable examples of aliphatic bridging groups are hydrocarbyls, such as, for example, paraffins and olefins. Suitable examples of cyclic bridging groups are cycloparaffins, cycloolefins, cycloacetylenes, and arenes. Additionally, it should be noted that substituted silicon and germanium radicals can also be used as bridging units.

Various processes are known to make these catalysts. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; 5,623,034; and 5,668,230; the entire disclosures of which are hereby incorporated by reference.

Specific examples of metallocenes that can be used to make such catalysts are as follows:

(cyclopentadienyl) titanium trichloride;
ethyl(indenyl) titanium trichloride;
ethyl(tetrahydroindenyl) titanium trichloride;
n-butylcyclopentadienyl titanium trichloride;
cyclopentadienyl titanium trichloride; and
indenyl titanium methoxy dichloride.

Organoaluminum compounds can be used in this invention and they have the following general formula.

FORMULA TWO: $Al(X^5)_n(X^6)_{3-n}$

In this formula ($X^5$) is a hydrocarbyl having from 1–20 carbon atoms. Currently, it is preferred when ($X^5$) is an alkyl having from 1 to 10 carbon atoms. However, it is most preferred when ($X^5$) is selected from the group consisting of methyl, ethyl, propyl, butyl, and isobutyl.

In this formula ($X^6$) is a halide, hydride, or alkoxide. Currently, it is preferred when ($X^6$) is independently selected from the group consisting of fluoro and chloro. However, it is most preferred when ($x^6$) is chloro.

In this formula "n" is a number from 1 to 3 inclusive. However, it is preferred when "n" is 3.

Examples of such compounds are as follows:
trimethylaluminum;
triethylaluminum;
tripropylaluminum;
tributylaluminum;
triisobutylaluminum hydride; and
triisobutylaluminum.

Currently, triisobutylaluminum is preferred.

The polymerizing is conducted under polymerization conditions. These polymerization conditions comprises a temperature and a pressure.

The temperature is from about 0° C. to about 300° C. However, it is more preferred when the temperature is from about 20° C. to about 200° C. and it is most preferred when the temperature is from 50° C. to 112° C.

The pressure is from about 100 kPa to about 10000 kPa. However, it is more preferred when the pressure is from about 500 kPa to about 6000 kPa and it is most preferred when the pressure is from 500 kPa to 5000 kPa.

The polymerizing is conducted in a polymerization zone. Currently, any reactor can be used for this polymerization. However, it is more preferred to use a loop slurry reactor. This reactors are well known in the polyethylene polymerization art.

It is most desirable to conduct the polymerization in the presence of isobutane which is the diluent in a slurry polymerization.

The monovinylaromatic polymer produced by this process comprises more than about 80 weight percent syndiotactic polymerized monovinylaromatic based on the weight of the monovinylaromatic polymer. However, it is more preferred when the monovinylaromatic polymer produced by this process comprises more than about 90 weight percent syndiotactic polymerized monovinylaromatic based on the weight of the monovinylaromatic polymer and it is most preferred when the monovinylaromatic polymer produced by this process comprises more than 95 weight percent syndiotactic polymerized monovinylaromatic based on the weight of the monovinylaromatic polymer.

EXAMPLES

Comparative Example One

In this example, styrene is polymerized using indenyl titanium methoxy dichloride.

(1) 300 milliliters of heptane was added to a reactor and then the heptane was heated to 70° C.
(2) 72.5 grams of styrene was then added to the reactor.
(3) 15 milliliters of a 10 weight percent mixture of methylaluminoxane in toluene was then added to the reactor.
(4) 0.010 grams of indenyl titanium methoxy dichloride in 15 milliliters of methylaluminoxane was then added to the reactor.

The polymerization was conducted in a temperature of 70° C. A white, sticky particle was obtained. The activity of the catalyst was 783 kilograms of polymer/per mole titanium·per hour·per mole styrene. The percent conversion of the styrene was 28 percent.

Comparative Example Two

In this example, styrene is polymerized using indenyl titanium methoxy dichloride.

(1) 300 milliliters of isopentane was added to a reactor and then the isopentane was heated to 70° C.
(2) 72 grams of styrene was then added to the reactor.
(3) 15 milliliters of a 10 weight percent mixture of methylaluminoxane in toluene was then added to the reactor.
(4) 0.010 grams of indenyl titanium methoxy dichloride in 15 milliliters of methylaluminoxane was then added to the reactor.

The polymerization was conducted in a temperature of 70° C. A white, sticky particle was obtained. The activity of the catalyst was 974 kilograms of polymer/per mole titanium·per hour·per mole styrene. The percent conversion of styrene was 35 percent.

Comparative Example Three

In this example, styrene is polymerized using indenyl titanium methoxy dichloride.

(1) 300 milliliters of pentane was added to a reactor and then the pentane was heated to 70° C.
(2) 72.5 grams of styrene was then added to the reactor.
(3) 15 milliliters of a 10 weight percent mixture of methylaluminoxane in toluene was then added to the reactor.
(4) 0.010 grams of indenyl titanium methoxy dichloride in 15 milliliters of methylaluminoxane was then added to the reactor.

The polymerization was conducted in a temperature of 70° C. A white, very-sticky particle was obtained. The activity of the catalyst was 233 kilograms of polymer/per mole titanium·per hour·per mole styrene. The percent conversion of styrene was 8 percent.

Comparative Example Four

In this example, styrene is polymerized using indenyl titanium methoxy dichloride.

(1) 700 milliliters of cyclohexane was added to a reactor and then the cyclohexane was heated to 60° C.
(2) 110 grams of styrene was then added to the reactor.
(3) 1 cubic centimeter of triisobutylaluminum was then added to the reactor.
(4) 23 milliliters of a 10 weight percent mixture of methylaluminoxane in toluene was then added to the reactor.
(5) 0.020 grams of indenyl titanium methoxy dichloride in 23 milliliters of methylaluminoxane was then added to the reactor.

The polymerization was conducted in a temperature range of 60° C. to 61° C. A white, particle was obtained. The activity of the catalyst was 554 kilograms of polymer/per mole titanium·per hour·per mole styrene. The percent conversion of the styrene was 40 percent.

Example One

In this example, styrene is polymerized using indenyl titanium methoxy dichloride.

(1) 600 milliliters of isobutane was added to a reactor and then the isobutane was heated to 60° C.

(2) 72.5 grams of styrene was then added to the reactor.

(3) 0.8 cubic centimeters of triisobutylaluminum was then added to the reactor.

(4) 15 milliliters of a 10 weight percent mixture of methylaluminoxane in toluene was then added to the reactor.

(5) 0.010 grams of indenyl titanium methoxy dichloride in 14 milliliters of methylaluminoxane was then added to the reactor.

The polymerization was conducted in a temperature range of 60° C. to 72° C. A white, non-sticky particle was obtained. It was syndiotactic polystyrene. The activity of the catalyst was 1838 kilograms of polymer/per mole titanium·per hour·per mole styrene. The percent conversion of the styrene was 66 percent.

That which is claimed is:

1. A process for producing a monovinylaromatic polymer comprising contacting a monovinyl aromatic compound selected from styrene and alkyl substituted styrenes having 8 to 20 carbon atoms under particle form conditions in isobutane and in the presence of a catalyst system comprising (1) a half-sandwich bonded metallocene selected from the formula $$InTi(OR)Cl_2$$

wherein In is indenyl or a hydrocarbyl substituted indenyl in which the substituents are selected from methyl, ethyl, and phenyl and wherein R is an alkyl group having 1 to 10 carbon atoms and (2) a cocatalyst comprising methylaluminoxane.

2. A process according to claim 1 wherein the monovinyl aromatic compound is styrene.

3. A process according to claim 1 conducted at a temperature in the range of about 0° C. to about 300° C. and a pressure of about 100 kPa to about 10,000 kPa.

4. A process according to claim 3 wherein the metallocene is indenyl titanium methoxy dichloride.

5. A process according to claim 4 carried out at a temperature in the range of from about 50° C. to about 112° C.

6. A process according to claim 5 carried out in a slurry reactor.

7. A process according to claim 3 wherein the metallocene is indenyl titanium ethoxy dichloride.

8. A process according to claim 3 wherein In is a methyl substituted indenyl.

9. A process according to claim 8 wherein In is a monomethyl substituted indenyl.

10. A process according to claim 3 wherein In is a phenyl substituted indenyl.

* * * * *